United States Patent [19]

Martenas et al.

[11] E Re. 31,464

Best Available Copy [45] Reissued Dec. 20, 1983

[54] DAMPED APPARATUS FOR QUICK-STOPPING ROTATING MEMBERS

[75] Inventors: Wayne B. Martenas, New Holland; Edward H. Priepke, Stevens; Robert A. Wagstaff, New Holland, all of Pa.

[73] Assignee: Sperry Corporation, New Holland, Pa.

[21] Appl. No.: 432,164

[22] Filed: Sep. 30, 1982

Related U.S. Patent Documents

Reissue of:

[64] Patent No.: 4,296,591
Issued: Oct. 27, 1981
Appl. No.: 192,783
Filed: Oct. 1, 1980

[51] Int. Cl.[3] ..... A01D 75/18
[52] U.S. Cl. ..... 56/10.3; 56/12.6
[58] Field of Search ..... 56/10.3, 12.6, DIG. 15, 56/10.2

[56] References Cited

U.S. PATENT DOCUMENTS 3,796,288 3/1974 Hollnagel ..... 188/129
3,959,953 6/1976 Garrott ..... 56/10.2
4,063,405 12/1977 McIlwain ..... 56/12.6
4,193,248 3/1980 Gilleman ..... 56/10.2

FOREIGN PATENT DOCUMENTS 2069657 8/1981 United Kingdom ..... 273/143

OTHER PUBLICATIONS

Service Manual, Sperry New Holland, Forage Harvesters, Electronic Metal Detector, 1978, pp. 17-19.

*Primary Examiner*—Paul J. Hirsch
*Attorney, Agent, or Firm*—Darrell F. Marquette; Larry W. Miller; Frank A. Seemar

[57] ABSTRACT

Quick or instantaneous stopping of rapidly rotating members places severe stress loads on components. These loads are substantially reduced by providing a quick-stopping apparatus including a damped member having an attached element which is movable into engagement with a rotating member. In response to such engagement, the energy of the rotating member is rapidly decelerated through the damped member thus reducing peak stress loads associated with almost instantaneous deceleration.

8 Claims, 5 Drawing Figures

DAMPED APPARATUS FOR QUICK-STOPPING ROTATING MEMBERS

Matter enclosed in heavy brackets [ ] appears in the original patent but forms no part of this reissue specification; matter printed in italics indicates the additions made by reissue.

BACKGROUND OF THE INVENTION

This invention relates generally to harvesters and more particularly to those having condition responsive operation.

Recently, harvesters have been provided with metal detectors for detecting metal in crop material. Metal detection is important since metal can damage harvester cutter mechanisms and, if ingested by farm animals, can be fatal.

It has been found to be advantageous to place metal detectors in the vicinity of the feed rolls of a harvester. Thus, upon detection of metal, signals from the detector actuate a device which quick-stops the rapidly rotating feed rolls in a fraction of a second. Such stopping, being almost instanteous, causes sever stress loads on driveline components and components of the stopping device.

In the past, a stop device has been provided to impact against a resilient member. Although some energy is absorbed by the resilient member, the stopping action is almost instantaneous and the stress loads are high thus limiting satisfactory lift of above-mentioned components.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing an apparatus for quick-stopping a rotating member including a reaction member supported for movement relative to the rotating member. Means are provided for damping movement of the reaction member. A stop is connected for movement with the reaction member and is also movable relative to the reaction member between a first position, free of engagement with the rotating member, and a second position in engagement with the rotating member. Means are attached for moving the stop between the first and second positions.

The above mentioned components permit an energy absorbing rapid deceleration of the rotating member rather than a highly stressful, almost instantaneous stop.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
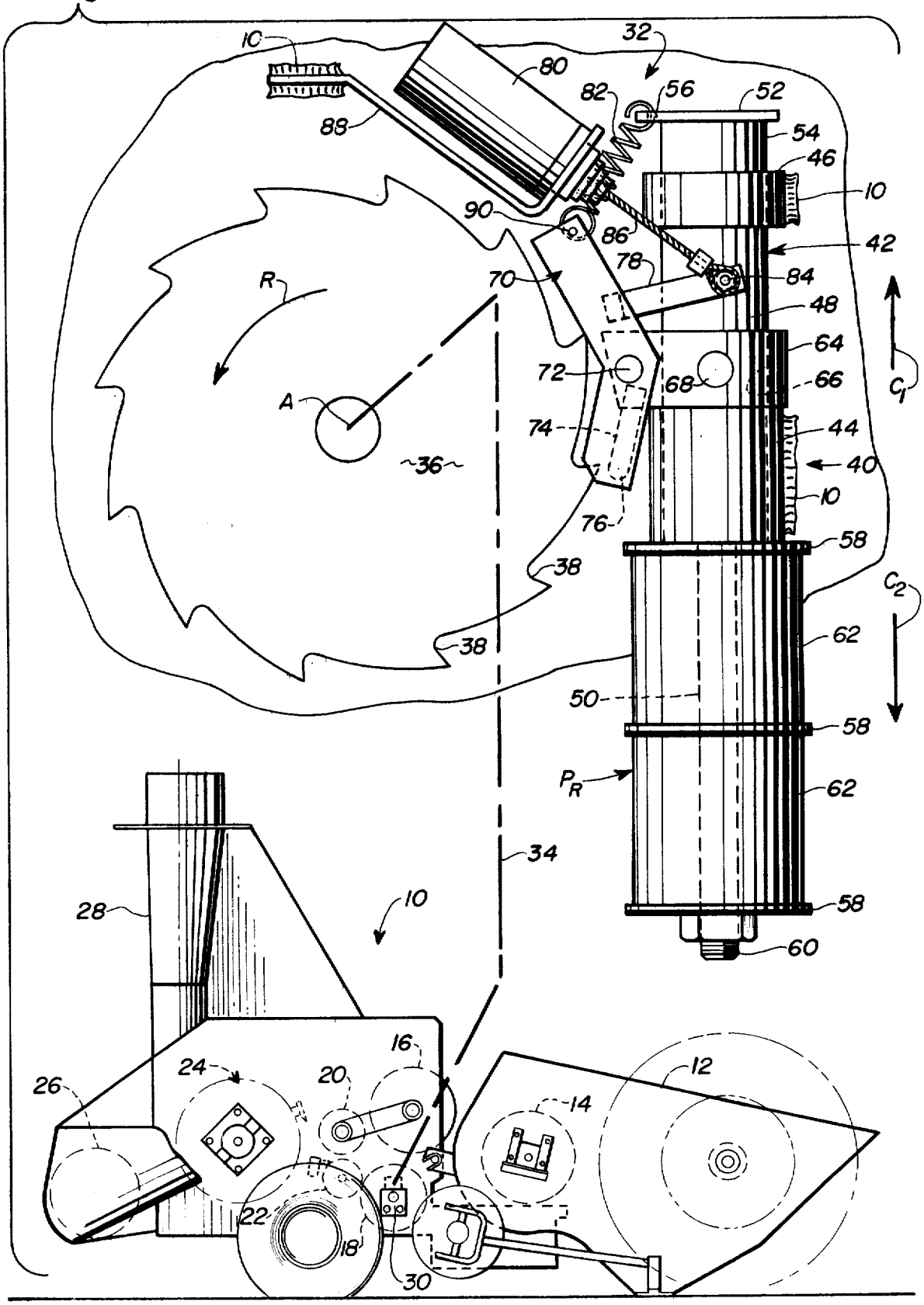
FIG. 1 is a side elevational view illustrating the preferred embodiment of the quick-stop apparatus of this invention out of engagement with a rotatable member operably combined with a crop harvesting machine shown in inset.

In FIG. 1, an exemplary harvesting machine 10 includes an attachment 12 for gathering crop material and feeding the material sequentially to an auger 14, then between a first pair of feed rolls 16,18, a second pair of feed rools 20,22 and then to a crop chopping or cutting device 24. Thereafter, the chopped crop material is delivered via a conveyor 26 to be expelled from a spout 28. It is well known that many of these general features of a crop harvesting machine are common to both pull-type and self-propelled units.

Lower feed roll 18 has been found to be an advantageous location for a known metal detector unit 30. Metal detected in the vicinity of the feed rolls causes a signal to be sent to a stop device which stops the feed rolls in a fraction of a second thus avoiding further passage of the detected metal.

An advantageous quick-stop apparatus generally designated 32, is operably connected to feed roll 18. An appropriate, well known linkage and drive system 34 ultimately connects the rotating feed roll 18 to an associated rotating member such as a ratchet wheel 36 formed of a suitable metal and having a plurality of concave notches 38 formed about the wheel circumference. Wheel 36 is mounted for rotation about an axis A in a direction indicated by an arrow designated R.

Figure 2:
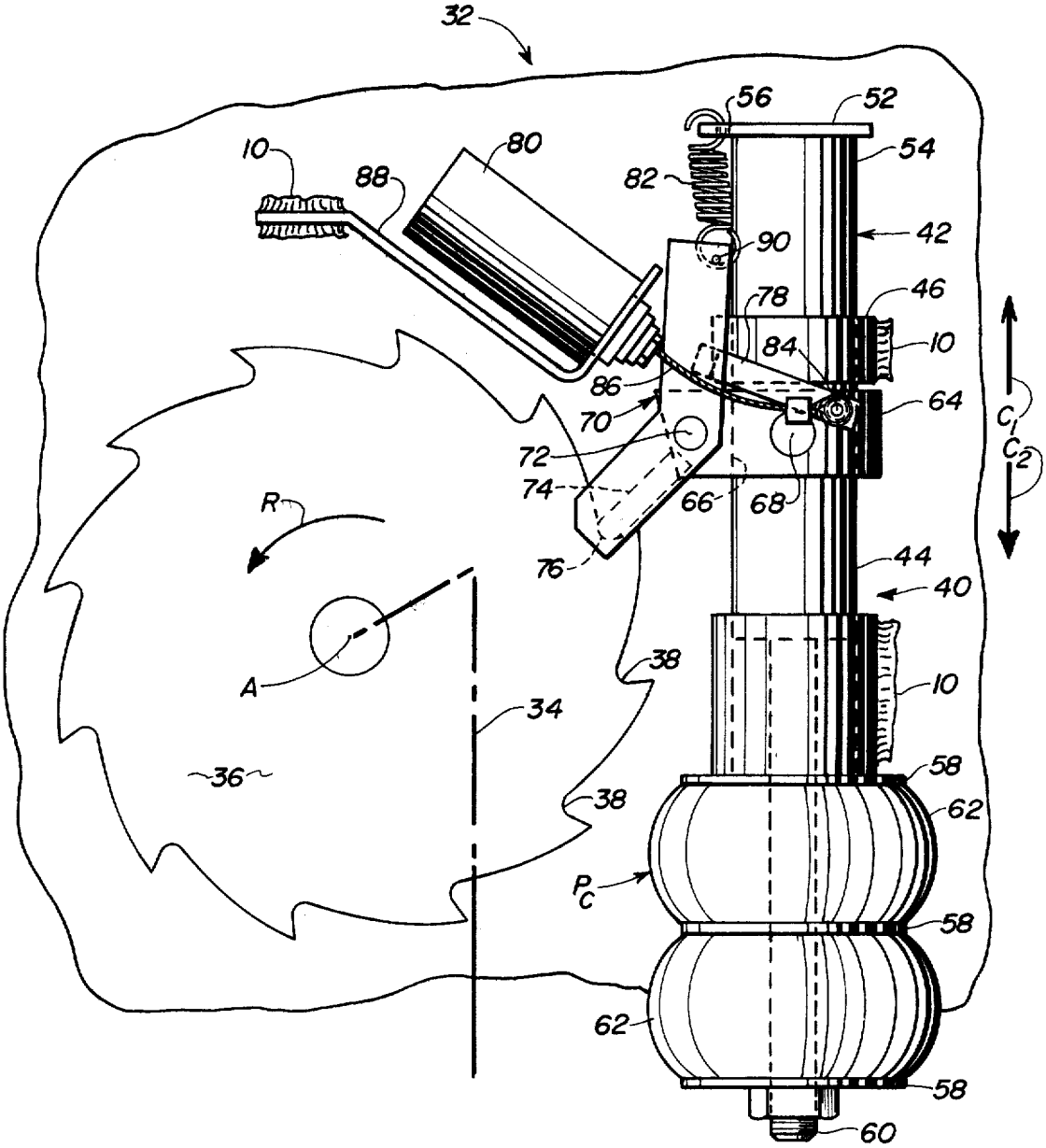
FIG. 2 is a side elevational view illustrating the preferred embodiment of FIG. 1 in engagement with the rotatable member.

A shock absorber type reaction member, FIGS. 1 and 2, is generally designated 40 and is mounted adjacent wheel 36. Member 40 includes a slide 42 having a stop 70 and a stop mount 64. Slide 42 is supported by support sleeves 44,46. Slide 42, stop 70 and stop mount 64 are movable relative to support sleeves 44,46 and relative to ratchet wheel 36. This is accomplished by slidably mounting the steel slide portion 42 in at least one but preferably the two fixed tubular steel supports 44,46 mounted on harvester 10.

Slide 42 includes a cylindrical portion 48 and a reduced diameter extension 50. Cylindrical portion 48 is slidably mounted in suports 44,46. A suitable steel plate 52 is preferably welded to an end 54 of portion 48 and an aperture 56 is formed in plate 52.

A plurality of steel plates 58 are carried by extension 50 between support 44 and a threaded end of extension 50. Means, such as a pair of elastomeric members 62 are carried by extension 50 in a manner separating plates 58, for damping movement of slide 42. This is accomplished by movement of slide 42 in supports 44,46 in the direction indicated by an arrow designated $C_1$, for compressing members 62 between plates 58 in a position designated $P_c$ (FIG. 2), thus absorbing energy imposed on slide 42. Obviously, energy thus absorbed by members 62 will move slide 42 in the direction of an arrow designated $C_2$ returning members 62 in a relaxed position designated $P_R$, see FIG. 1. Elastomeric members 62 are commercially available and are preferably formed of neoprene.

The tubular stop mount 64 is preferably a steel casting having a bore 66 formed therethrough. Mount 64 is removably attached to slide portion 42 via a pin 68. In this manner, mount 64 reciprocates with slide portion 42 and is limited from rotation by pin 68.

The stop 70 includes a dog-leg shaped steel flat pivotally attached to mount 64 at pin 72 having a pawl 74 fixedly attached thereto such as by welding or the like. A rounded or convex end 76 of pawl 74 is formed for mating engagement with concave notches 38. In this manner stop 70 is movable with reaction member 40 and is also movable relative to reaction member 40. Such relative movement is accomplished by stop 70 being pivoted about pin 72 between a first position, free of engagement with ratchet wheel 36, see FIG. 1, and a second position in engagement with wheel 36, see FIG. 2. A steel flat forms an extension 78 fixedly attached to stop 70 such as by welding or the like.

Means, such as a solenoid 80 and a tension spring 82, are connected for moving stop 70 between the first and second positions. In the preferred embodiment, see FIGS. 1 and 2, solenoid 80 is connected to extension 78 at pin 84 by a suitable flexible steel cable 86 for pivoting stop 70 about pin 72. A suitable brace 88 retains solenoid 80 in a fixed position relative to reaction member 40. Brace 88 is secured to machine 10 by welding or the like. Thus, solenoid 80 is in a fixed position relative to the movable reaction member 40. Resilient steel tension spring 82 interconnects stop 70 and plate 52 of slide 42. One end of spring 82 is secured through aperture 56 of plate 52 and another end of spring 82 is secured through an aperture 90 formed in stop 70. Solenoid 80 is preferably a commercially available Series 1500 sold under the tradename SYNCHRO-START.

In FIG. 1, solenoid 80 is illustrated in an energized mode wherein stop 70 is pivoted by cable 86 to the first position as previously described. In FIG. 2, solenoid 80 is illustrated in a deenergized mode wherein stop 70 is pivoted by spring 82 to the second position as previously described.

Figure 3:
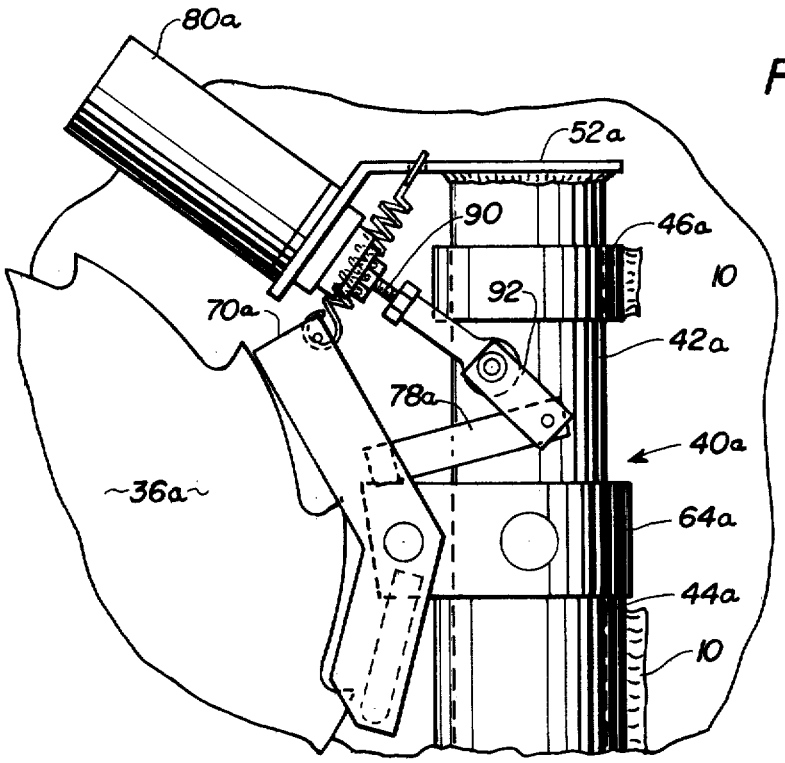
FIG. 3 is a partial side-elevational view illustrating an alternative embodiment of the quick-stop apparatus of this invention out of engagement with a rotatable member.
Figure 4:
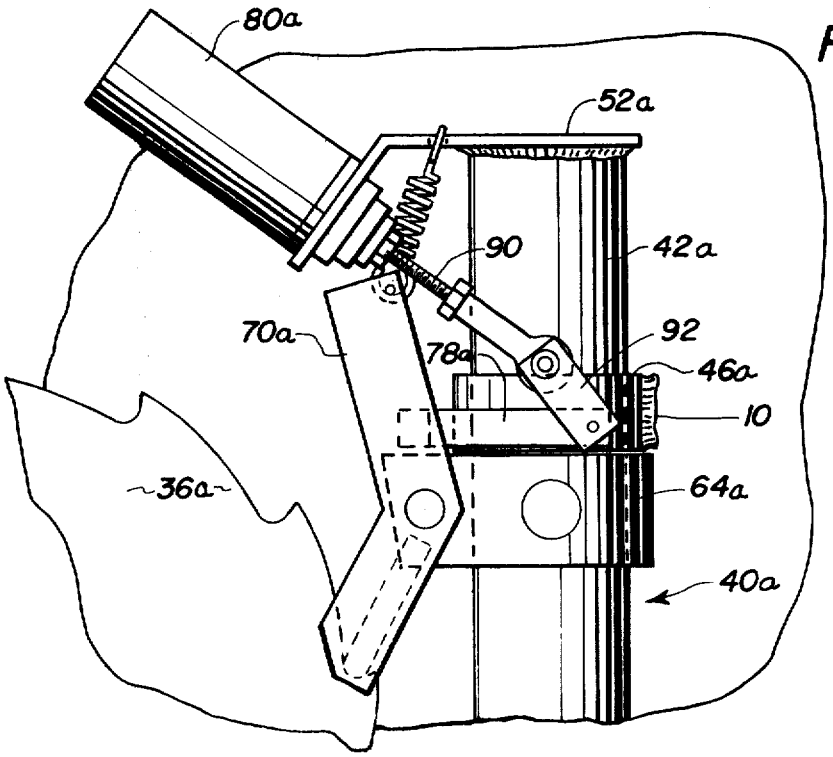
FIG. 4 is a partial side elevational view illustrating the alternative embodiment of FIG. 3 in engagement with the rotatable member.

FIGS. 3 and 4 illustrate an alternative embodiment which is basically the same as the embodiment of FIGS. 1 and 2. One difference is that plate 52a of slide 42a also functions as a brace for supporting solenoid 80a. Thus, solenoid 80a moves with slide 42a but has a greater exposure to shock loads and vibration. Also, in the alternative embodiments of FIGS. 3 and 4, since solenoid 80a moves with slide 42a rather than relative to it, a rigid rod 90, rather than a cable 86 (FIGS. 1 and 2), can be pivotally linked to a rigid arm 92 which is pivotally linked to extension 78a for interconnecting solenoid 80a and stop 70a.

Figure 5:
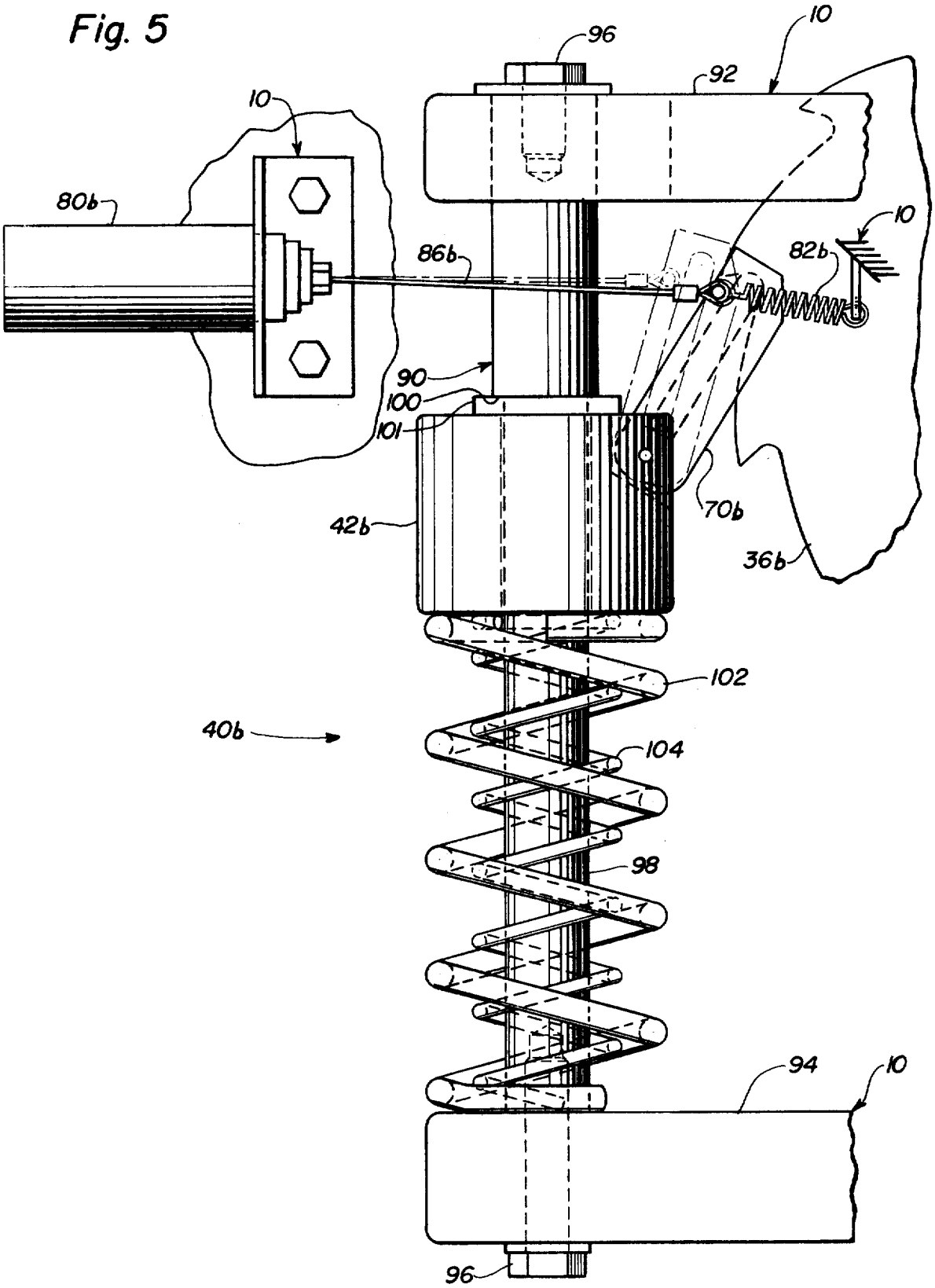
FIG. 5 is a partial side elevational view illustrating another alternative embodiment.

The alternative embodiment of FIG. 5 includes a reaction member 40b adjacent ratchet wheel 36b. Member 40b includes a slide 42b having a stop 70b. Slide 42b is supported by a stationary support rod 90 secured by bolts 96 in support flanges 92,94. Flanges 92,94 are affixed to machine 10. Stop 70b is pivotally carried on slide 42b for movement between the first and second positions as previously discussed. Rod 90 includes a first diameter portion 96 separated from a reduced diameter portion 98 by a shoulder 100 and an abutting washer 101. Slide 42b is urged into engagement with washer 101 by a pair of concentric steel compression springs 102,104. Upon engagement of stop 70b with ratchet wheel 36b, slide 42b moves relative to support rod 90 and flanges 92,94 for compressing springs 102,104 thus damping movement of slide 42b. Solenoid 80b is secured on machine 10 and a flexible cable 86b connects to move stop 70b to the first position when solenoid 80b is energized. A spring 82b moves stop 70b to the second position when solenoid 80b is deenergized. The significant difference here is that slide 42b slides on a stationary rod 90 and concentric springs 102,104 are used rather than elastomeric members 62.

With the parts assembled as set forth above, it can be seen that when stop 70 is in the first position as illustrated in FIGS. 1 and 2, ratchet wheel 36 can freely rotate in direction R. Upon deenergization of solenoid 80, spring 82 pivots stop 70 about pin 72 urging pawl 74 into one of the notches 38. Forces acting on stop 70 are transmitted to slide 42 of reaction member 40 thus moving slide 42 in direction $C_1$ relative to solenoid 80, which compresses elastic elements 62 into position $P_c$ between plates 58. After the forces are dissipated, elements 62 relax to position $P_R$ and slide 42 moves in direction $C_2$.

In the alternative embodiment illustrated in FIGS. 3 and 4, solenoid 80a is fixedly attached to slide 42a and thus moves with slide 42a rather than remaining stationary. In the alternative embodiment illustrated in FIG. 5, compression springs 102,104 are used to damp movement of slide 42b mounted on stationary rod 90.

The foregoing has described a damped apparatus for quick-stopping rotating members wherein the energy of the rotating member is rapidly decelerated through a damped member thus reducing peak stress loads associated with almost instantaneous deceleration.

It is anticipated that aspects of the present invention, other than those specifically defined in the appended claims, can be obtained from the foregoing description and the drawings.

Having thus described the invention, what is claimed is:

1. A damped apparatus for quick-stopping a rotating member *which is connected to rotate with a feed roll of a crop harvesting machine, said damped apparatus* comprising:

a reaction member supported adjacent said rotating member, said reaction member including a slide and a slide support, said slide movable relative to said support;

a stop carried by said slide, said stop movable relative to said slide between a first position, free of engagement with said rotating member, and a second position in engagement with said rotating member;

means connected for damping movement of said slide in response to said stop being in said second position; and means connected for moving said stop between said first and second positions.

2. The apparatus of claim 1 wherein said stop is pivotally connected to said slide.

3. The apparatus of claim 1 wherein said means for moving said stop includes a solenoid and a resilient member.

4. The apparatus of claim 3 wherein said stop is pivotable to said first position in response to said solenoid being energized.

5. The apparatus of claim 4 wherein said stop is pivotable to said second position by said resilient member in response to said solenoid being deenergized.

6. The apparatus of claim 5 wherein said means for damping includes at least one resilient member connected for compression in response to movement of said slide.

7. The apparatus of claim 3 wherein said slide includes a plate at one end and said solenoid is connected to said plate.

[8. The apparatus of claim 1 wherein said rotating member is connected to rotate with a feed roll of a crop harvesting machine.]

9. In a combination with a crop harvesting machine including a metal detector operably mounted in the vicinity of a feed roll of the harvester, a damped apparatus for quick-stopping rotation of the feed roll comprising:

a rotatable member connected for rotating with the feed roll;

a reaction member supported on the harvester, said reaction member including a slide support and a slide, said slide movable relative to said support;

a stop carried by said slide and mounted for pivotal movement relative to said slide, said movement being between a first position, free of engagement with said rotatable member, and a second position in engagement with said rotatable member;

means connected for damping movement of said slide in response to said stop being in said second position; and means for moving said stop between said first and said second positions, said means including a solenoid connected to be energized for pivoting said stop into said first position and including a resilient member connected for pivoting said stop into said second position in response to said solenoid being deenergized.

* * * * *